A. CALDER.
Car-Axle Box and Spring.

No. 197,455.  Patented Nov. 27, 1877.

Attest:
Thomas Beech.
Philip J. Edmund.

Inventor
Alexander Calder
By atty.
Henry Beech.

UNITED STATES PATENT OFFICE.

ALEXANDER CALDER, OF LONDON, ONTARIO, CANADA.

IMPROVEMENT IN CAR AXLE-BOXES AND SPRINGS.

Specification forming part of Letters Patent No. 197,455, dated November 27, 1877; application filed June 4, 1877.

*To all whom it may concern:*

Be it known that I, ALEXANDER CALDER, of the city of London, in the Province of Ontario, Canada, have invented certain new and useful Improvements in Springs for Street-Cars; and I do hereby declare that the following is a full, clear, and exact description of the same, reference being made to the accompanying drawing, forming a part of this specification, in which—

Figure 1:
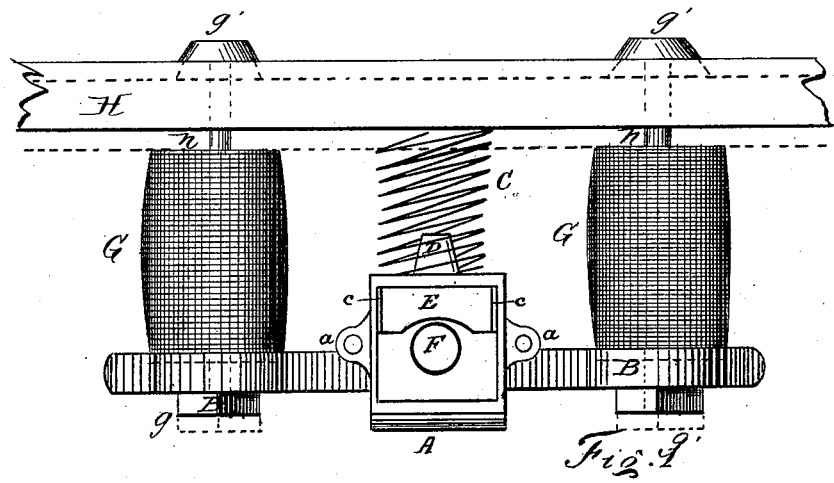
Figure 2:
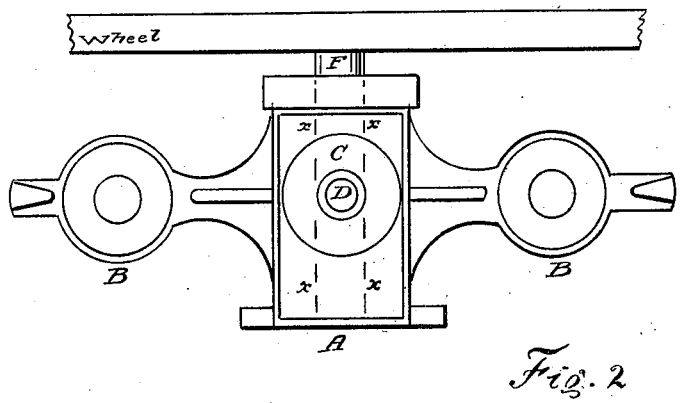

Figure 1 is a front elevation. Fig. 2 is a plan or top view, and Fig. 3 is a view of the journal-plate.

This invention relates to improvements in springs for street-cars and other vehicles; and the invention consists in the combination, with the sill of a vehicle, of a journal-box provided with extension-pieces having rubber springs and a stud and coiled spring, so arranged that the vehicle, when loaded, is supported by the rubber and coiled springs, and when empty supported merely by the coiled spring, thereby relieving the pressure upon the rubber springs, and allowing them to assume their original or proper position.

In the drawing, A represents the journal-box, having its ends closed by a removable plate. B B are extension-pieces, for receiving the rubber springs or bearings G G. C represents a strong coiled spring, fitted around an upright stud, D, on top of the journal-box. The journal-box, with its springs, is secured directly to the under side of the sill H of the vehicle by means of the stay-bolts $h$ passing up through the extension-pieces, the rubber bearings, and the sill H, as clearly shown in Fig. 1. Two of these boxes will be used to each axle—that is, one at each end—and they are attached outside the wheels. The axle will pass through each pair of boxes, as shown by dotted lines $x$ $x$ in Fig. 2. Said journal-box is also to be supported upon a stay-rod parallel with and secured to the sill of the vehicle, in the usual manner, in which case the stay-rods $h$ will also pass through the said parallel stay-rod.

Figure 3:
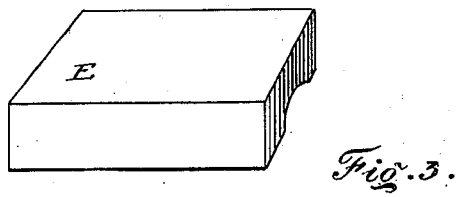

E is a journal-plate, of the shape shown in Fig. 3, and this plate fits loosely between the cheeks $c$ $c$ on the inner side of the journal-box, and is hollowed on the under side, so as to lie on the top of axle F, in the form of a journal-bearing, while the remaining space in the journal-box round the axle is packed with oiled cotton.

By the above construction and arrangement of parts I am enabled to dispense with the pedestal used for carrying the axle-boxes of vehicles, whereby all wear and friction on the sides of the axle-box are prevented, as the weight, when loaded, is carried on all the spring-bearings, and, when empty, supported and raised by the coiled spring, thereby allowing the rubber springs or bearing to expand, which prevents them from getting out of shape.

I claim as my invention—

The combination, with the sill of a vehicle, of the journal-box A, having the stud D, coiled spring C, and extension-pieces B, provided with rubber springs or bearings G, secured directly to the under side of the sill H, substantially as and for the purpose specified.

ALEXANDER CALDER.

Witnesses:
HENRY BEECH,
THOMAS BEECH.